United States Patent [19]
Marchal et al.

[11] 3,748,826
[45] July 31, 1973

[54] MASS SEPARATOR
[75] Inventors: Philippe Albert Hippolyte Marchal, Boulogne; Jacques Louis Paul Simonnet, Gif-sur-Yvette; Georges Mordchelles Regnier, Neauphle-Le-Chateau; Jean Prudent Fernand Rene Verrien, Paris, all of France
[73] Assignee: Bertin & Cie and Entreprise de Recherches et D'Activities Petrolieres-ELF, Paris, France
[22] Filed: Aug. 5, 1970
[21] Appl. No.: 61,213

[30] Foreign Application Priority Data
Aug. 11, 1969  France .............................. 6927599

[52] U.S. Cl. .................................................. 55/17
[51] Int. Cl. ............................................. B01d 57/00
[58] Field of Search .......................... 55/15, 17, 277

[56] References Cited
UNITED STATES PATENTS
3,109,721  11/1963  Zenner et al. ......................... 55/15
2,951,554  9/1960  Becker .................................... 55/17
3,299,616  1/1967  Lucas ..................................... 55/17

Primary Examiner—Charles N. Hart
Attorney—Brufsky, Stass, Breiner and Halsey

[57] ABSTRACT

A fluid mixture is separated into constituents having the same physical and/or chemical nature which were intimately mixed in the mixture, in pipes where wave phenomena occur and into which pulses of the mixture are alternately directed, a mixture enriched with the heavy constituent being collected at the inlet of the pulsating pipes and a mixture enriched with the light constituent being collected at the outlet. A conduit for supplying a continuous flow of the fluid mixture to be separated is connected to pipes disposed in extension of the supply conduit, means being provided for converting the continuous supply flow into fluid pulses which are introduced into the pipes where they produce pulsatory phenomena; the inlet zone of these pipes is connected to a chamber for sampling the heavy constituent while their output zone is connected to a chamber for sampling the light constituent.

2 Claims, 4 Drawing Figures

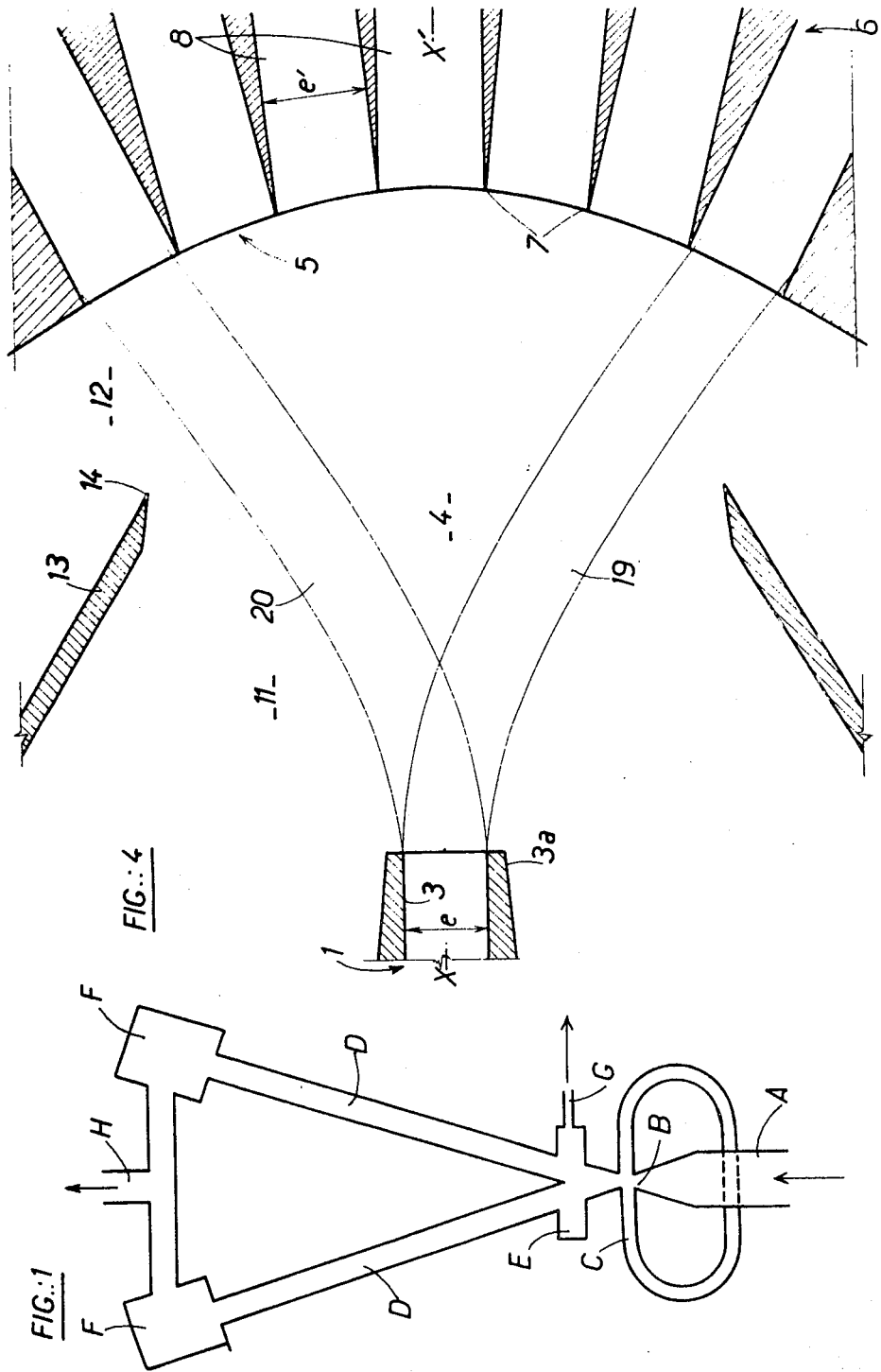

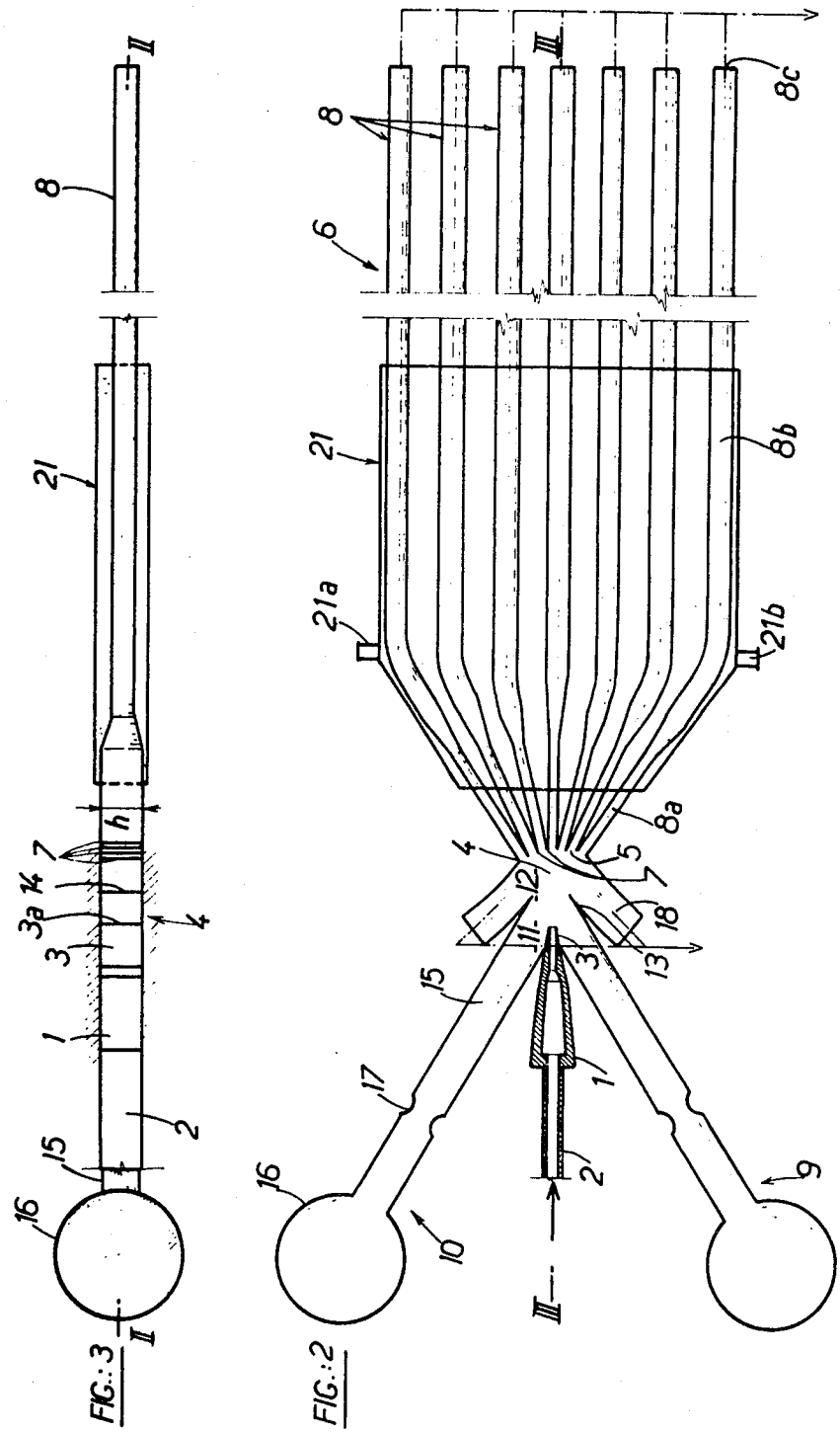

MASS SEPARATOR

This invention relates to the separation of a fluid mixture (usually but not necessarily a natural mixture) into constituents, by a method which takes advantage of the specific volumetric weights of the constituents. The aim of the invention is to perform the separation under operating conditions which are much simpler and less laborious than conventional methods of mass separation such as those involving the use of centrifuges, mass spectrometers and the like.

According to the invention, constituents of a fluid mixture are separated by means producing flows in which wave phenomena occur. Such means are known for other applications which are quite unrelated to mass separation, e.g. thermal applications such as the production of cold.

Means for working such thermal applications have been described in French Pat. No. 1.540.320 dated Mar. 1, 1967 and in U.S. Pat. applications No. 757 896 dated Sept. 6, 1968 and No. 845 018 dated July 25, 1969. The known means involves the use of pulsating pipes into which gaseous pulses are alternately directed, preferably by means of a static fluid flip-flop acting on a continuous inflow.

The invention relates to a novel application of the afore-mentioned known means to mass separation.

The mass separation in question appears to be due to the very abrupt accelerations and decelerations to which the molecules in the fluid mixture are repeatedly subjected as a result of the pulsatory phenomena produced in the pulsating pipes. A compression wave may accelerate the molecules by amounts of the order of $10^6$ to $10^8$ m/sec/sec. Owing to their inertia, light molecules and heavy molecules acquire different speeds and are consequently classified; a fluid enriched with the heavy constituent is collected at the inlet of the pulsating pipes and a fluid enriched with the light constituent is collected at the outlet.

The following exemplary non-limitative description and accompanying drawing will clearly show how the invention can be put into practice.

In the drawings :

FIG. 1 is a simplified diagram illustrating the application of the invention and showing a separation stage;

FIG. 2 shows a more elaborate device for working the invention and is a cross-section along the line II—II of FIG. 3;

FIG. 3 is a cross-section along the line III—III of FIG. 2, and

FIG. 4 is a partial view on a larger scale.

In the diagram in FIG. 1, a continuous flow of a gaseous mixture arrives via a conduit A at a nozzle B which by means of a static fluid flip-flop C alternately guides the flow into the first or second of two pipes D—D so that pulsatory phenomena occur in the pipes. A sampling chamber E is disposed upstream of the pipes and sampling chambers F—F are disposed downstream of the pipes.

It is found that the fluid G sampled in chamber E is enriched with the heavy constituent, whereas the fluid H sampled in the chamber F—F is enriched with the light constituent, compared with the proportions contained in the fluid introduced through conduit 1. The relative enrichment can be gradually increased by connecting a number of separation stages as shown in FIG. 1 in cascade.

The applicants have made tests on fluids such as air, which was separated into oxygen and nitrogen, and argon, which was separated into isotope 36 and isotope 40. The results show relative enrichments of a few tenths per cent per stage, an appreciable figure in view of the simplicity of the installation.

Higher yields can be obtained with more elaborate means such as those described in the afore-mentioned U.S. Pat. application No. 845 018 and shown in FIGS. 2, 3 and 4.

The device shown in FIGS. 2–4 comprises an injector 1 supplied with gas under pressure by a pipe 2 and having a rectangular nozzle 3 having a small width $e$ and height $h$. The compressed gas travelling through the nozzle forms a sonic stream in a chamber 4 which is bounded opposite nozzle 3 by the inlet orifices 5 of a group of receiving tubes 6. Orifices 5 are likewise rectangular and have a height $h$ and width $e'$; they are disposed side by side in an arc centred on the axis XX' of injector 1 and are separated by sharp edges 7. Tubes 8 forming the group 6 extend fanwise and each have a portion 8a which has the same rectangular shape as orifice 5 and is connected to a portion 8b of circular cross-section which terminates at 8c.

Two pilot circuits 9, 10 disposed one on each side of injector I have an opening 11 which terminates in chamber 4 and is separated from nozzle 3 by a common wall 3a and from the chamber outlet opening 12 by a wall 13 having a sharp edge 14. Each pilot circuit comprises a tube 15 connected to opening 11 at one end and to a chamber 16 at the other end and formed with a constriction 17. A tube 18 extending from each outlet opening 12 is used for sampling the gas enriched with the heavy constituent in chamber 4.

When tube 2 is supplied with a mixture of compressed gas, the stream ejected through nozzle 3 into chamber 4 oscillates between two extreme positions diagrammatically shown at 19 and 20, at a frequency imposed by the pilot circuits 9, 10. As it oscillates, the stream sweeps the inlet orifices 5 and produces bursts in tubes 8 so that the gas molecules are classified by mass in the manner already described. A fraction enriched with the heavy product is collected at outputs 12 and tubes 18, whereas a fraction enriched with the light products is collected at the outlet 8c of tubes 8.

Preferably the number of tubes 8 is odd so that the stream is more likely to become unstable and start oscillating.

Edges 14 together with injector wall 3a form the inlets of resonators 9, 10. The position of edges 14 with respect to the injector and the receiving orifices 5 has a critical effect on the start of oscillations by the stream and on its extreme positions 19, 20.

We claim:

1. The process of separating a gaseous mixture into its constituents by the use of a pipe system comprising a plurality of pipes in parallel, each of said pipes having an inlet and an outlet, comprising the steps of delivering pulses of said gaseous mixture to said plurality of pipes of said system through the inlets thereof towards the outlets thereof, collecting a mixture enriched with heavier constituent near said inlets, and collecting a mixture enriched with lighter constituent near said outlets.

2. The process of claim 1 wherein said pipe system comprises a plurality of pipes in parallel with juxtaposed inlets, said process comprising the step of controllably deflecting a continuous flow of said gaseous mixture so as to sweep successively said juxtaposed inlets.

* * * * *

UNITED STATES PATENT OFFICE
CERTIFICATE OF CORRECTION

Patent No. 3,748,826             Dated   July 31, 1973

Inventor(s)  Philippe Albert Hippolyte MARCHAL ET AL

It is certified that error appears in the above-identified patent and that said Letters Patent are hereby corrected as shown below:

In the heading, [75] Inventors:, "Georges Mordchelles Regnier" should read -- Georges Mordchelles-Regnier --; In the heading, [73] Assignee:, "Entreprise de Recherches et D'Activities Petrolieres-ELF" should read -- Entreprise de Recherches et D'Activites Petrolieres-ELF --.

Signed and sealed this 30th day of July 1974.

(SEAL)
Attest:

McCOY M. GIBSON, JR.
Attesting Officer

C. MARSHALL DANN
Commissioner of Patents